(12) United States Patent
Reilly et al.

(10) Patent No.: US 8,371,561 B2
(45) Date of Patent: Feb. 12, 2013

(54) AERATION DIFFUSER ASSEMBLY END SEAL

(75) Inventors: James A. Reilly, Shrewsbury, MA (US);
Anders G. Berfner, Sundbyberg (SE);
Per Olov Marcus Porath, Bromma (SE)

(73) Assignee: XYLEM IP Holdings LLC, White Plains, NY (US)

( * ) Notice: Subject to any disclaimer, the term of this patent is extended or adjusted under 35 U.S.C. 154(b) by 421 days.

(21) Appl. No.: 12/758,369

(22) Filed: Apr. 12, 2010

(65) Prior Publication Data
US 2011/0248414 A1 Oct. 13, 2011

(51) Int. Cl.
*B01F 3/04* (2006.01)

(52) U.S. Cl. ............ 261/122.1; 261/124; 261/DIG. 70; 210/220

(58) Field of Classification Search ............ 261/118, 261/122.1, 124, DIG. 70; 96/4; 210/220
See application file for complete search history.

(56) References Cited

U.S. PATENT DOCUMENTS

| | | | |
|---|---|---|---|
| 2,212,841 A | 8/1940 | Maxwell |
| 3,063,689 A | 11/1962 | Coppock |
| 3,083,953 A | 4/1963 | Langdon et al. |
| 3,432,154 A | 3/1969 | Danjes |
| 3,768,788 A | 10/1973 | Candel |
| 3,837,629 A | 9/1974 | Matras et al. |
| 3,953,553 A | 4/1976 | Thayer |
| 3,954,922 A | 5/1976 | Walker et al. |
| 3,992,491 A | 11/1976 | Ihrig et al. |
| 4,029,581 A | 6/1977 | Clough, Jr. et al. |
| 4,060,486 A | 11/1977 | Schreiber |
| 4,606,867 A | 8/1986 | Eguchi |
| 4,624,781 A | 11/1986 | Messner |
| 4,629,126 A | 12/1986 | Goudy, Jr. et al. |
| 4,631,134 A | 12/1986 | Schussler |
| 4,734,191 A | 3/1988 | Schussler |
| 4,960,546 A | 10/1990 | Tharp |
| 4,961,854 A | 10/1990 | Wittmann et al. |
| 5,000,884 A | 3/1991 | Bassfeld |
| 5,013,493 A | 5/1991 | Tharp |
| 5,015,421 A | 5/1991 | Messner |
| 5,032,325 A | 7/1991 | Tharp |
| 5,093,047 A | 3/1992 | Zeppenfeld |
| 5,098,581 A | 3/1992 | Roediger |
| 5,133,862 A | 7/1992 | Cannan et al. |
| 5,133,876 A | 7/1992 | Tharp |

(Continued)

FOREIGN PATENT DOCUMENTS

| AT | 391 126 | 8/1990 |
|---|---|---|
| CA | 2 482 435 | 11/2003 |

(Continued)

OTHER PUBLICATIONS

Written Opinion of the International Preliminary Examining Authority for PCT/US2011/028757 Dated Mar. 23, 2012.

(Continued)

*Primary Examiner* — Robert A Hopkins
(74) *Attorney, Agent, or Firm* — RatnerPrestia

(57) ABSTRACT

An aeration assembly includes an end fitting having a top piece for attachment to a diffuser member. A gasket extends beneath the top piece. The aeration assembly may include a diffuser member with the end fitting. In one embodiment, the diffuser member has a hollow conduit section and a flange section. The flange section includes a series of openings extending along a length of the diffuser member. The openings extend through the flange section to an interior space in the conduit section.

21 Claims, 4 Drawing Sheets

U.S. PATENT DOCUMENTS

| | | | |
|---|---|---|---|
| 5,158,715 A | 10/1992 | Jager | |
| 5,192,467 A | 3/1993 | Strung et al. | |
| 5,330,688 A | 7/1994 | Downs | |
| 5,352,391 A | 10/1994 | Heck | |
| 5,378,355 A | 1/1995 | Winkler | |
| 5,458,771 A | 10/1995 | Todd | |
| 5,672,270 A | 9/1997 | Yoshimura | |
| 5,681,509 A | 10/1997 | Bailey | |
| 5,846,412 A | 12/1998 | Tharp | |
| 5,851,447 A | 12/1998 | Tyer | |
| 5,868,971 A | 2/1999 | Meyer | |
| 5,868,972 A | 2/1999 | Galich et al. | |
| 6,193,220 B1 | 2/2001 | Kelly | |
| 6,244,574 B1 | 6/2001 | Downs | |
| 6,344,138 B1 | 2/2002 | Del Guerra | |
| 6,406,005 B1 | 6/2002 | Lawson et al. | |
| 6,808,165 B1 | 10/2004 | Sperber et al. | |
| 7,255,333 B2 | 8/2007 | Casper et al. | |
| 2002/0003314 A1 | 1/2002 | Cantz | |
| 2004/0124550 A1 | 7/2004 | Casper | |
| 2008/0251954 A1 | 10/2008 | Casper et al. | |

FOREIGN PATENT DOCUMENTS

| | | |
|---|---|---|
| DE | 2 261 994 | 6/1974 |
| DE | 32 24 177 | 12/1983 |
| DE | 34 41 731 | 5/1986 |
| DE | 37 10 739 | 10/1988 |
| DE | 87 06 219 | 10/1988 |
| DE | 37 16744 | 12/1988 |
| DE | 41 04 287 | 8/1992 |
| DE | 42 06 136 | 9/1992 |
| DE | 42 40 300 | 6/1994 |
| DE | 43 14 766 | 9/1994 |
| DE | 94 12 161 U1 | 5/1995 |
| DE | 200 07 347 U1 | 8/2000 |
| DE | 102 18 073 | 11/2003 |
| EP | 0 625 484 | 11/1994 |
| EP | 0 947 471 | 10/1999 |
| EP | 0 947 473 | 10/1999 |
| EP | 2 018 905 | 1/2009 |
| GB | 1 304 147 | 1/1973 |
| GB | 2 438 851 | 12/2007 |
| JP | 61-8120 | 1/1986 |
| WO | WO 98/21151 | 5/1998 |
| WO | WO 99/67014 | 12/1999 |
| WO | WO 03/043722 | 5/2003 |
| WO | WO 2004/014532 | 2/2004 |

OTHER PUBLICATIONS

International Search Report issued in PCT/US2011/028757 filed Mar. 17, 2011, mailed Jul. 26, 2011.

AERATION DIFFUSER ASSEMBLY END SEAL

FIELD OF THE INVENTION

The present invention relates generally to aeration systems for treating water and wastewater, and more specifically to membrane strip diffusers and membrane panel diffusers.

BACKGROUND OF THE INVENTION

Many systems for treating water and wastewater include some form of aeration. Aeration is the process of adding oxygen to water or wastewater. Some aeration systems add oxygen through one or more diffusers mounted at the bottom of a tank. The tank is filled with water or wastewater to be treated, submerging the diffusers. Each diffuser includes an air conduit with small holes. When compressed air is fed into the diffusers, the air exits the diffuser through the small holes into the water or wastewater. The air forms bubbles that transfer dissolved oxygen into the water.

Oxygen transfer efficiency in an aeration process is a function of the combined surface area of air bubbles that enter the water or wastewater. The rate of oxygen transfer increases as the combined surface area of the bubbles increases. A cluster of bubbles having small diameters will have a combined surface area significantly larger than a similarly sized cluster of bubbles having larger diameters. As a result, greater oxygen transfer efficiency can be achieved with diffusers that reduce the size of air bubbles.

SUMMARY OF THE INVENTION

An aeration assembly in accordance with one embodiment of the invention includes a diffuser member, membrane and end fitting. The diffuser member has a conduit section and a flange section, the conduit section surrounding an interior space. The membrane extends over the flange section. The membrane and flange section form a gas chamber therebetween, the gas chamber in fluid communication with the interior space of the conduit section. The end fitting includes a top piece arranged to apply a clamping force to the top surface of the membrane, a securing strap arranged to apply a clamping force to an edge portion of the membrane, and a tensioning mechanism arranged to provide a clamping force between the top piece and the flange section in a direction transverse to the flange section.

An aeration assembly in accordance with another embodiment includes a diffuser member, membrane and end fitting. The diffuser member includes a conduit section and a flange section, the conduit section surrounding an interior space. The membrane extends over the flange section. The membrane and flange section form a gas chamber therebetween, the gas chamber in fluid communication with the interior space of the conduit section. The end fitting includes a top piece arranged to apply a clamping force to the top surface of the membrane, a wing support arranged on a side of the flange section opposite the membrane, a strap arranged to apply a clamping force to an edge portion of the membrane, and a tensioning mechanism arranged to provide a clamping force between the top piece and the wing support in a direction transverse to the flange section.

An aeration assembly in accordance with another embodiment includes a diffuser member, membrane and end fitting. The diffuser member includes a conduit section and a flange section, the conduit section surrounding an interior space. The membrane extends over the flange section and has a pair of edge portions. The membrane and flange section form a gas chamber therebetween, the gas chamber in fluid communication with the interior space of the conduit section. The end fitting includes a top piece arranged to apply a clamping force to a top surface of the membrane, a strap arranged to apply a clamping force to the edge portions of the membrane, a gasket arranged to abut the top surface and the edge portions of the membrane, and a tensioning mechanism to provide a clamping force between the top piece and the flange section in a direction transverse to the flange section.

BRIEF DESCRIPTION OF THE DRAWINGS

The foregoing summary and the following description will be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Applicants have developed diffuser members that pass air through a membrane material with very small holes. During the aeration process, the small holes create a large number of air bubbles with very small diameters to increase the surface area between air and wastewater, thereby increasing the rate of oxygen transfer. This, in turn, increases the overall energy efficiency of the aeration system.

Applicants have observed that the oxygen transfer efficiency provided by membranes is reduced when air escapes from the diffusers without passing through the membrane. This often occurs with air bubbles that escape around the edges of the membrane. Air that seeps around the edges of the membrane, rather than passing through the small holes in the membrane, may escape in the form of large bubbles, causing a much lower rate of oxygen transfer. To address this issue, diffuser systems in accordance with the invention include mechanisms to seal the edges of membranes so that air must pass through the small holes in the membrane. As will be explained, the sealing mechanisms not only seal the edges of the membranes, but also provide a means for securing the top piece and flange to the conduit section.

Figure 1:
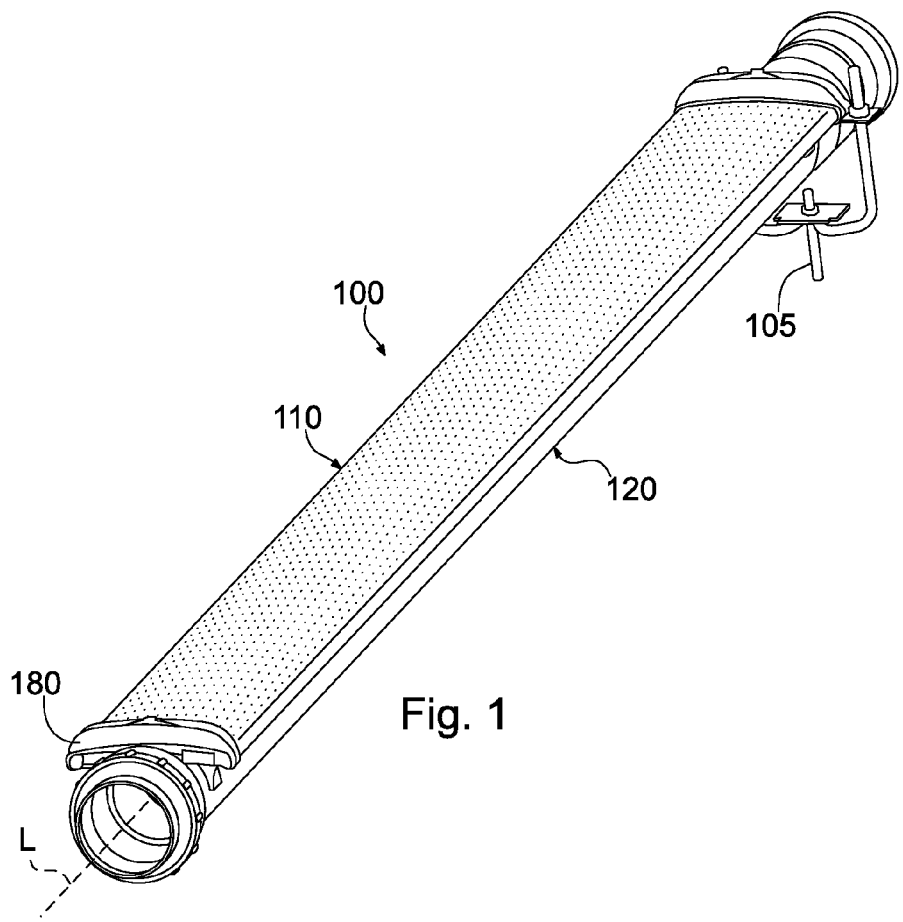
FIG. 1 is a perspective view of a diffuser assembly in accordance with one exemplary embodiment of the invention.
Figure 2:
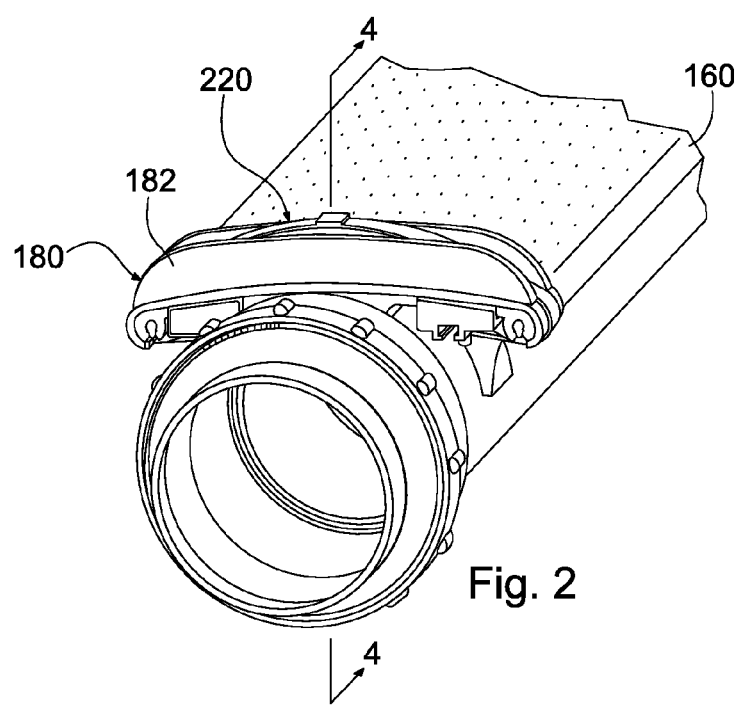
FIG. 2 is an enlarged perspective view of one end of the diffuser assembly of FIG. 1, with the remaining end of the diffuser assembly truncated for clarity.
Figure 3:
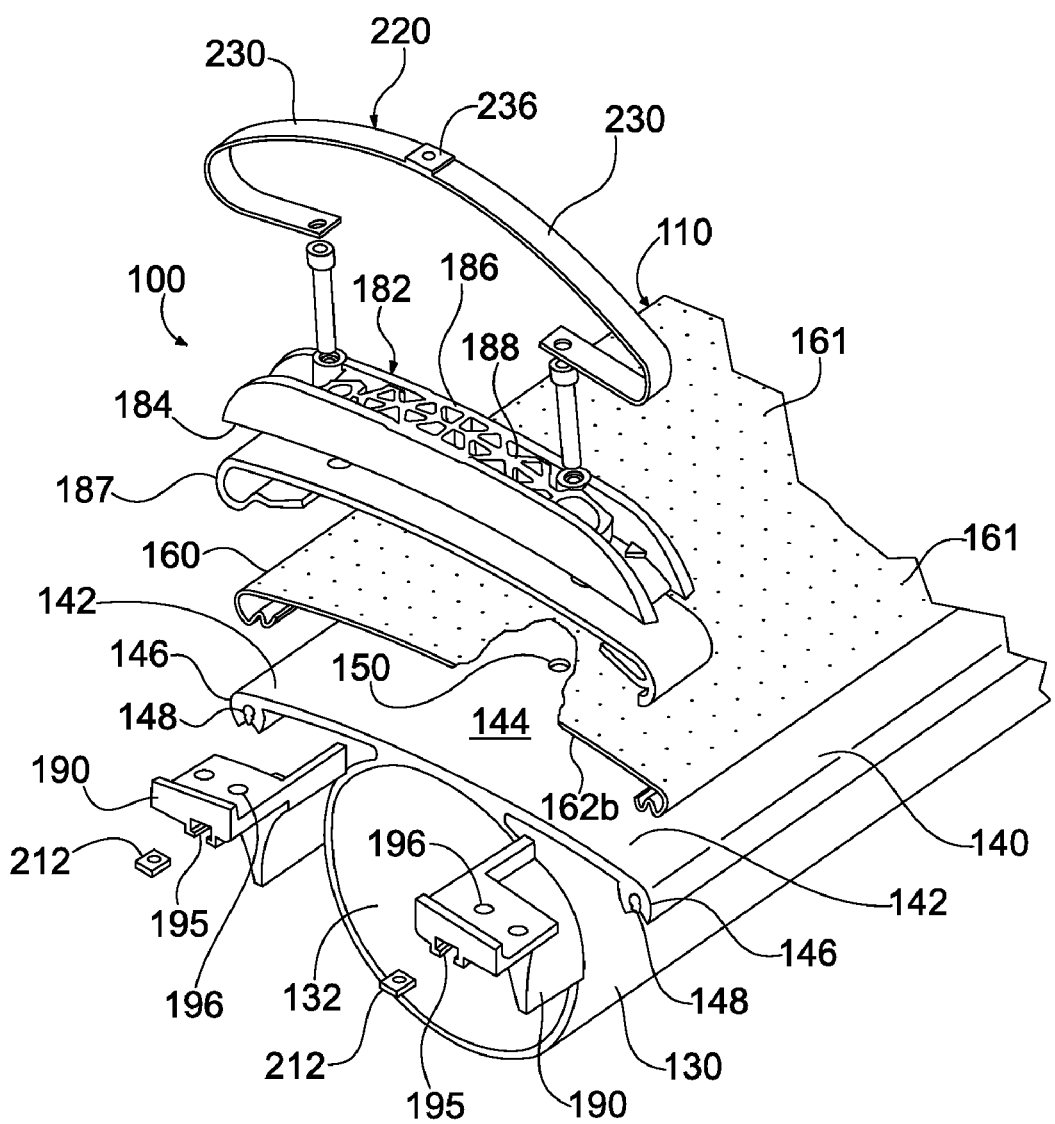
FIG. 3 is an exploded perspective view of one end of the diffuser assembly of FIG. 1, with the remaining end of the diffuser assembly truncated for clarity.

Referring now to FIGS. 1-3, an aeration diffuser assembly 100 is shown in accordance with an exemplary embodiment of the invention. Diffuser assembly 100 includes a support base 105 for mounting the assembly to a surface in an aeration tank, such as the bottom surface. Diffuser assembly 100 also includes a diffuser member 110 mounted on support base 105. Diffuser member 110 includes a body portion 120 with a flange section 140 and a membrane 160 mounted over the flange section. Membrane includes a plurality of small holes 161 that allow passage of air. Diffuser assembly 100 further includes an end fitting 180 that seals and secures an end portion of membrane 160 on the flange section 140.

Figure 4:
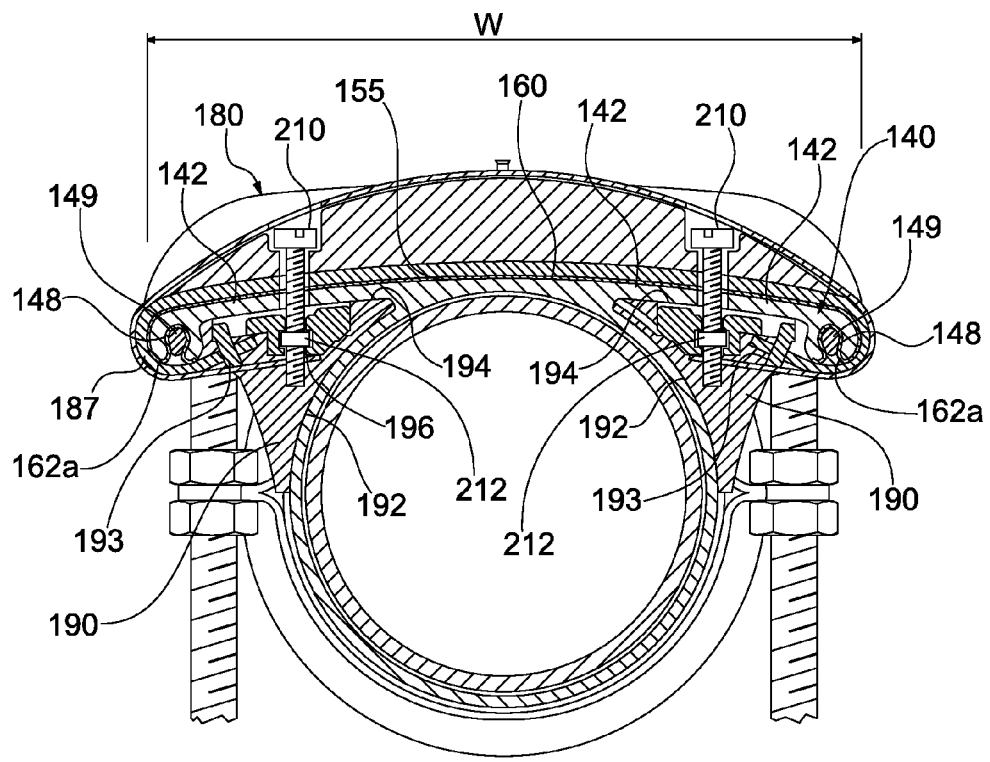
FIG. 4 is a cross section view of the diffuser assembly of FIG. 1, taken through line 4-4 in FIG. 2.

Referring now to FIG. 3, body portion 120 includes a generally cylindrical conduit section 130. Flange section 140 extends from conduit section 130 in a tangential arrangement. A gas chamber 155, shown in FIG. 4, is formed between the exterior of flange section 140 and the side of membrane 160 that faces the flange section. A series of air holes 150 extends along body portion 120. Air holes 150 pass from an interior space 132 in conduit section through the conduit section and flange section 140 into to gas chamber 155. In this arrangement, air holes 150 interconnect interior space 132 with the exterior of body portion 120. Body portion 120 is designed to receive compressed air and release some of it through the air holes 150 into the gas chamber. Where diffusers are installed in a row, body portion 120 conveys some of the compressed air to the adjacent diffuser in the row.

Diffuser assemblies in accordance with the invention provide mechanisms for mounting and sealing membranes. Membranes are sealed at their edge portions to prevent air in the diffuser from escaping around the edges of the membrane, forcing all air to pass through the membrane. Membranes have four edges that are sealed in the preferred assembly. For purposes of description, the phrase "side edge" or "side edges" refers to the longer edge portions 162a of the membrane running parallel to the longitudinal axis L of the conduit section, as identified and shown in FIG. 4. The phrase "end edge" or "end edges" refers to the shorter edge portions 162b of the membrane, as identified and shown in FIG. 3.

Flange portions in accordance with the invention may have a number of different geometries to support a membrane. For example, the flange may have a single flange section or "wing" extending from the conduit section, or multiple wings. Flange section 140 includes a pair of wings 142 that extend symmetrically and outwardly from conduit section 130, forming an end profile as shown in FIG. 4. Wings 142 form a support surface 144 on which membrane 160 is mounted. Each wing 142 has a free end 146 that forms a longitudinal groove 148. Each groove 148 is adapted to receive a side edge 162a of membrane 160 and seal the side edge so as to prevent air from escaping around that side edge. Each groove 148 includes an elongated cord 149 inserted into the groove over a side edge 162a of membrane 160 to seal the side edge. Cords 149 may be made of an elastomeric material to provide fluid-tight seals in grooves 148.

End fittings in accordance with the invention provide a fluid tight seal at the end edges of a membrane. Two end fittings may be used to seal the end edges of a membrane, with one end fitting placed at each end of the diffuser body, as shown in FIG. 1. It will be appreciated that more than two fittings may be used on a diffuser member in accordance with the invention. For example, three or more fittings may be used to secure the membrane onto a diffuser body, and this may be desirable for longer diffuser members. One or more fittings may be placed at or adjacent to an end edge of a membrane. In addition, one or more fittings may be placed over a midsection of the membrane at one or more positions longitudinally offset from the end edges. When three or more fittings are used, the fittings may be incrementally spaced along the length of the diffuser member at fixed spacings.

Figure 5:
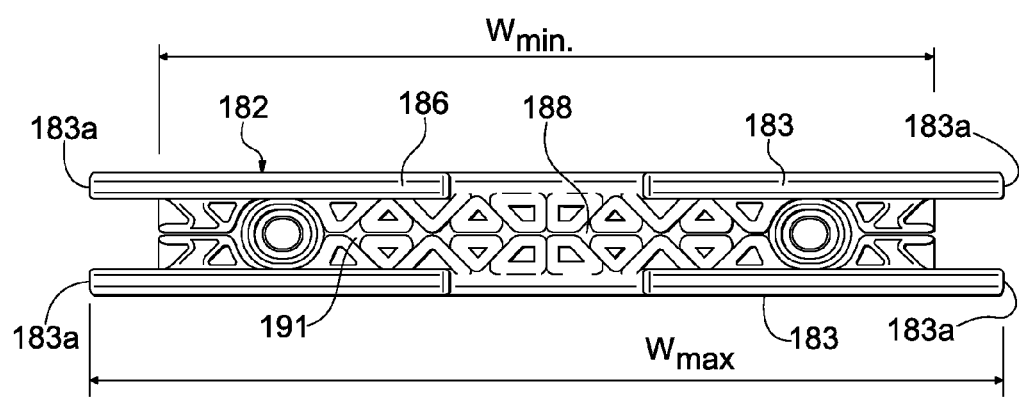
FIG. 5 is a top view of a first component of the diffuser assembly of FIG. 1.

End fitting 180 includes a top piece or bridge 182 mounted onto the diffuser member 110. Top piece 182 includes an inner surface 184 and an outer surface 186 opposite the inner surface. Inner surface 184 has a contour that generally conforms to the contour of support surface 144 on flange section 140. Outer surface 186 includes an arc-shaped or rounded top surface 188. Top piece 182 further includes a central body portion 191 and a pair of end walls 183, one on each side of the central body portion, as shown in FIG. 5.

Top surface 188 forms an arc-shaped ramp surface above top piece 182. The arc-shaped geometry of top surface 188 allows for a smooth and gradual transition or intersection between the top surface and the edges of wings 142. This allows the straps 230 to be tensioned without interference from sharp corners or edges. The arc-shaped geometry of top surface 188 allows straps 230 to distribute a uniform pressure down into gasket 187 and membrane 160.

It is economical to manufacture plastic pipe conduits, like body portion 120, by an extrusion process. Extrusion processes are subject to relatively large tolerances, resulting in variations in dimensions. The width W of flange section 140, for example, can vary along the length of body portion 120. End fittings in accordance with the invention compensate for variations in width along flange section 140, thereby allowing the use of extruded parts. Referring to FIG. 5, end walls 183 of top piece 182 have a first width $W_{max}$, and top surface 188 has a second width $W_{min}$ that is less than $W_{max}$. $W_{min}$ closely approximates a minimum width measured on the flange section, and $W_{max}$ closely approximates a maximum width measured on the flange section. With this arrangement, top piece 182 applies a compressive sealing force across the entire width of support surface 144, regardless of the variations along the length of flange section 140. That is, top surface 188 is configured to extend across the minimum width of flange section 140. End walls 183 each form extensions 183a that extend laterally to cover any additional width on either side of the flange section. By covering the additional width, end walls 183 provide sealing properties at the outermost ends of the wings 142, where the wing is wider than the minimum width due to tolerances. At these wider sections, top piece 182 bears against the entire width of body portion, and therefore, adequately seals the membrane across the full span of the flange section. End walls 183 also provide added stiffness to top piece 182, preventing the top piece from deflecting.

Figure 10:
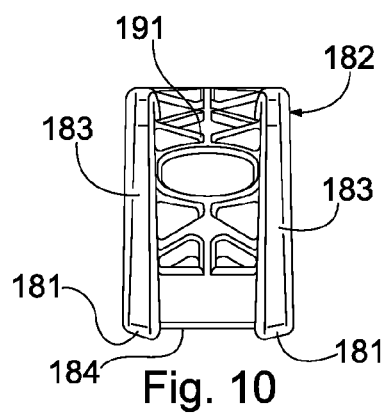
FIG. 10 is an end view of the component of FIG. 5.

Referring to FIG. 10, end walls 183 extend lower than the bottom of central body portion 191. That is, each end wall 183 features a barb 181 that projects beneath central body portion 191. In this arrangement, barbs 181 press farther into gasket 140 and membrane 160, as compared to central body portion, providing enhanced sealing force along end walls 183. This arrangement applies more concentrated pressure beneath the end walls 183, thereby ensuring that more sealing force is distributed across the wider end wall width $W_{max}$. This prevents the membrane from pulling out from under top piece 182 and gasket 140 during operation of the diffuser assembly.

Figure 8:
FIG. 8 is a top view of a third component of the diffuser assembly of FIG. 1.

The diffuser assembly may include one or more layers of material between the top piece 182 and membrane 160, and/or between the membrane and flange section 140. Referring to FIGS. 3, 4 and 8, end fitting 180 includes a gasket 187 placed between top piece 182 and membrane 160. Gasket 187 is formed of an elastomeric material and provides a fluid-tight seal at any section where end fitting 180 is placed along diffuser member 110. Two pairs of apertures 189a, 189b are provided through gasket 187 to allow passage of a fastener, as will be described in more detail below. The assembly may also include a compliant layer underneath membrane 160, i.e. between the membrane and flange section 140, to absorb any unevenness along the flange section. Unevenness may arise, for example, when the flange section is made by extrusion. For clarity, the compliant layer is not shown in the Figures, but it is intended that a compliant layer would appear in the illustrations like gasket 187, but positioned between membrane 160 and flange section 140. The compliant layer may be made of silicone.

Figure 6:
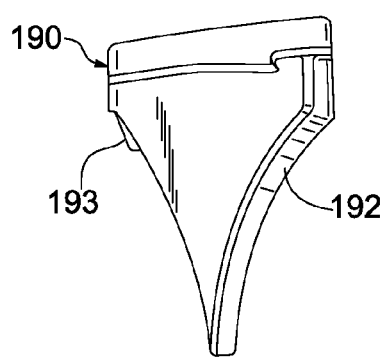
FIG. 6 is a front view of a second component of the diffuser assembly of FIG. 1.
Figure 7:
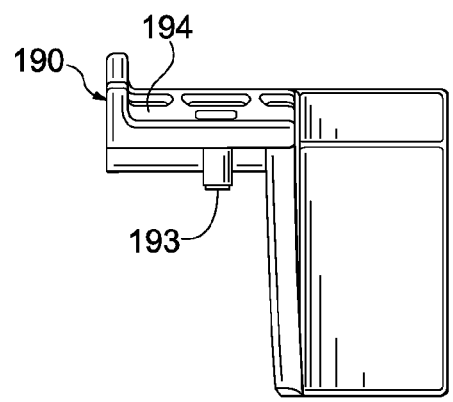
FIG. 7 is a side view of the component of FIG. 6.

Referring now to FIGS. 4, 6 and 7, end fitting 180 includes a pair of wing supports 190. Each wing support 190 includes a rounded surface 192 for attachment to the exterior of conduit section 130, and a generally flat surface 194 for abutment against the underside of one of the wings 142 on flange section 140. Each generally flat surface 194 is shaped to conform with the shape of the underside of a wing, so that the flat surfaces and undersides of the wings have contours that are complementary with one another. Wing supports 190 provide mechanisms for anchoring end fitting 180 onto the diffuser member 110. In addition, wing supports 190 provide a rigid support beneath wings 142 to match the geometry of flange section 140 with that of the top piece 182. Wing supports 190 may be attached to conduit section 130 using a variety of connection methods or means, including but not limited to ultrasonic welding or adhesives.

With regard to the anchoring function, each wing support 190 includes a fastener bore 196 adapted to receive a fastener 210. A number of different fasteners may be used in accordance with the invention to anchor the end fitting onto the diffuser member. Fastener 210 is a bolt having a threaded shaft that extends through top piece 182, gasket 187, membrane 160, flange section 140 and wing support 190. Top piece 182, gasket 187, membrane 160, flange section 140 and wing support 190 each include apertures and bores that align with another to facilitate passage of two fasteners 210. Each wing support 190 houses a nut 212 having a threaded bore adapted to receive the threaded shaft of fastener 210. Nut 212 is housed within a slot 195 extending transversely to fastener bore 192. Upon inserting the fastener 210 through the nut 212, and upon rotating the fastener in a clockwise direction, the fastener and nut press top piece 182 and gasket 187 firmly against flange section 140, securely clamping the membrane 160 between the gasket and flange section.

The side ends of gasket 187 extend outwardly beyond the outermost edge of top piece 182, as seen in FIG. 4. These excess sections of gasket 187 are anchored separately on pegs 193 that extend from the underside of each wing support 190. As noted above, the free end 146 of each wing 142 has a longitudinal groove 148 that receives a side edge 162a of membrane 160. An elongated cord 149 is inserted into each groove 148 over a portion of the membrane 160 to anchor that portion of the membrane in the groove and seal the side edge 162a along the length of diffuser member 110.

Figure 9:
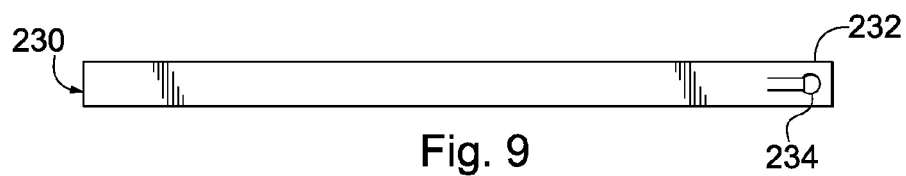
FIG. 9 is a top view of a fourth component of the diffuser assembly of FIG. 1.

End fittings in accordance with the invention may include a tensioning mechanism to apply a uniform load across the width of the flange section of the diffuser body. Referring to FIGS. 2 and 3, a tensioning mechanism 220 includes a pair of securing straps 230. Tensioning mechanism 220 is configured to secure membrane 160 over body portion 120, particularly over the outer edges of the wings 142 so that gas leaks do not occur. Securing straps 230 extend over top surface 188 of body portion 120. Each securing strap 230 has an anchoring end 232, which is shown in more detail in FIG. 9. Each anchoring end 232 includes an aperture 234 adapted to placed around the end of a fastener 210. In this configuration, anchoring end 232 can be attached to an end of a fastener 210 that extends through its respective wing support 190. Securing straps 230 are pulled down tightly over top surface 188 and locked in place with a strap lock 236. A number of tensioning straps, locks and tools may be used in accordance with the invention, including, for example, stainless steel band clamping systems and tools.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An aeration assembly comprising:
   a diffuser member comprising a conduit section and a flange section, the conduit section surrounding an interior space;
   a membrane extending over the flange section, the membrane and flange section forming a gas chamber therebetween, the gas chamber in fluid communication with the interior space of the conduit section, and
   an end fitting comprising a top piece arranged to apply a clamping force to the top surface of the membrane, a securing strap arranged to apply a clamping force to an edge portion of the membrane, and a tensioning mechanism arranged to provide a clamping force between the top piece and the flange section in a direction transverse to the flange section.

2. The aeration assembly of claim 1 comprising a wing support attached to a first surface on the conduit section and a contacting a second surface on the flange section.

3. The aeration assembly of claim 2, wherein the tensioning mechanism is constituted by at least one fastener anchored into the wing support.

4. The aeration assembly of claim 3, wherein the securing strap has an end forming a fastener hole, the fastener hole receiving the at least one fastener.

5. The aeration assembly of claim 1, wherein the flange section comprises a pair of wings extending symmetrically and outwardly from the conduit section.

6. The aeration assembly of claim 5, wherein each of the wings comprises a free end forming a longitudinal groove that extends along the length of the free end.

7. The aeration assembly of claim 6 comprising a flexible cord in each of the longitudinal grooves, each flexible cord inserted over an edge portion of the membrane to secure said edge portion in the groove.

8. The aeration assembly of claim 1, wherein the top piece comprises an inner surface that engages the diffuser member and an outer surface opposite the inner surface.

9. The aeration assembly of claim 8 wherein the securing strap extends over the outer surface of the top piece.

10. The aeration assembly of claim 9, wherein the securing strap comprises a pair of securing straps.

11. The aeration assembly of claim 10, wherein the top piece has an arc-shaped top surface.

12. An aeration assembly comprising:
    a diffuser member comprising a conduit section and a flange section, the conduit section surrounding an interior space;
    a membrane extending over the flange section, the membrane and flange section forming a gas chamber therebetween, the gas chamber in fluid communication with the interior space of the conduit section, and an end fitting comprising a top piece arranged to apply a clamping force to the top surface of the membrane, a wing support arranged on a side of the flange section opposite the membrane, a strap arranged to apply a clamping force to an edge portion of the membrane, and a tensioning mechanism arranged to provide a clamping force between the top piece and the wing support in a direction transverse to the flange section.

13. The aeration assembly of claim 12, wherein the tensioning mechanism is constituted by at least one fastener anchored into the wing support.

14. The aeration assembly of claim 13, wherein the securing strap has an end forming a fastener hole, the fastener hole receiving the at least one fastener.

15. The aeration assembly of claim 14, wherein the flange section comprises a pair of wings extending symmetrically and outwardly from the conduit section.

16. The aeration assembly of claim 15, wherein each of the wings comprises a free end forming a longitudinal groove that extends along the length of the free end, the aeration assembly comprising a flexible cord in each of the longitudinal grooves, each flexible cord inserted over an edge portion of the membrane to secure said edge portion in the groove.

17. The aeration assembly of claim 16, wherein the top piece has an arc-shaped top surface.

18. An aeration assembly comprising:
a diffuser member comprising a conduit section and a flange section, the conduit section surrounding an interior space;
a membrane extending over the flange section, the membrane having a pair of edge portions, the membrane and flange section forming a gas chamber therebetween, the gas chamber in fluid communication with the interior space of the conduit section, and
an end fitting comprising a top piece arranged to apply a clamping force to a top surface of the membrane, a strap arranged to apply a clamping force to the edge portions of the membrane, a gasket arranged to abut the top surface and the edge portions of the membrane, and a tensioning mechanism to provide a clamping force between the top piece and the flange section in a direction transverse to the flange section.

19. The aeration assembly of claim 18, comprising a wing support attached to a first surface on the conduit section and contacting a second surface on the flange section.

20. The aeration assembly of claim 19, wherein the tensioning mechanism is constituted by at least one fastener anchored into the wing support.

21. The aeration assembly of claim 18 comprising a compliant layer between the membrane and the flange section to absorb unevenness along the flange section.

* * * * *